Figure 1:
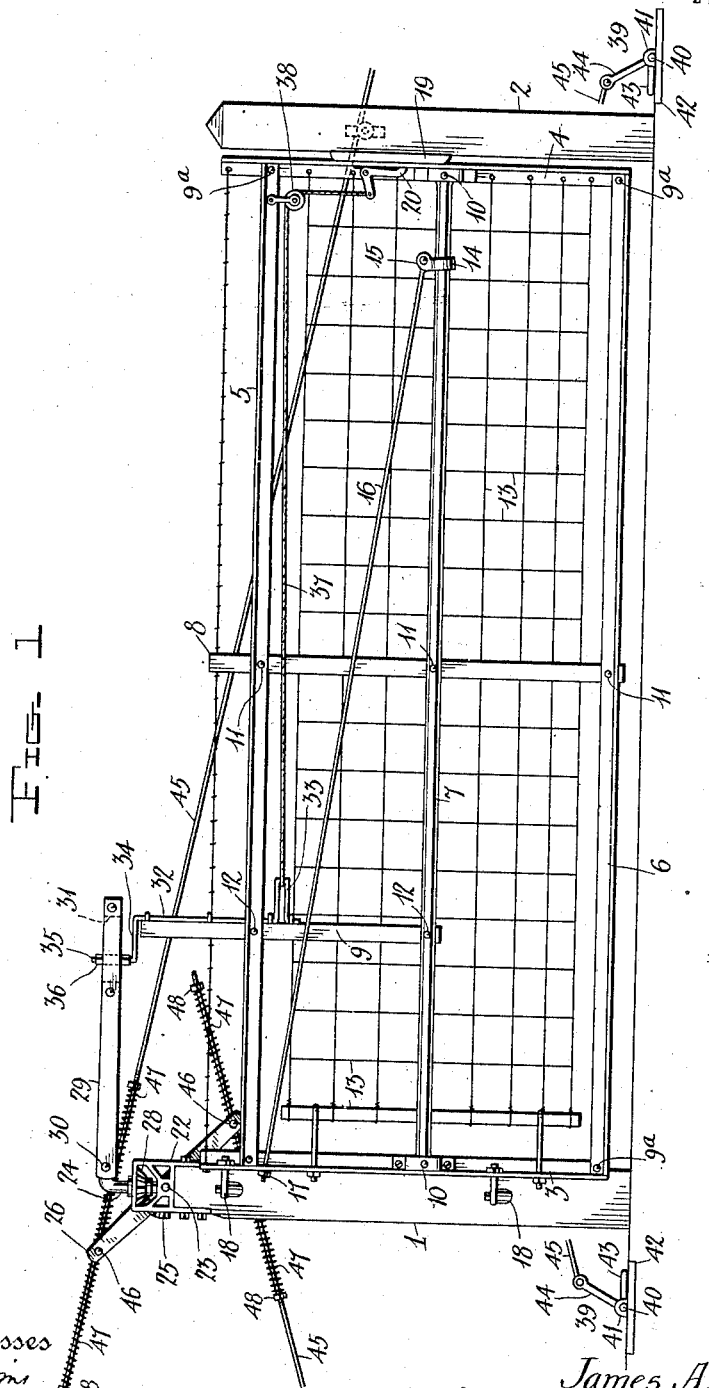

No. 868,642.

PATENTED OCT. 22, 1907.

J. A. CLEMENTS.
SWING GATE.
APPLICATION FILED OCT. 22, 1906.

2 SHEETS—SHEET 1.

Witnesses

Inventor
James A. Clements
by H. B. Willson & Co.
Attorneys

No. 868,642. PATENTED OCT. 22, 1907.
J. A. CLEMENTS.
SWING GATE.
APPLICATION FILED OCT. 22, 1906.
2 SHEETS—SHEET 2.
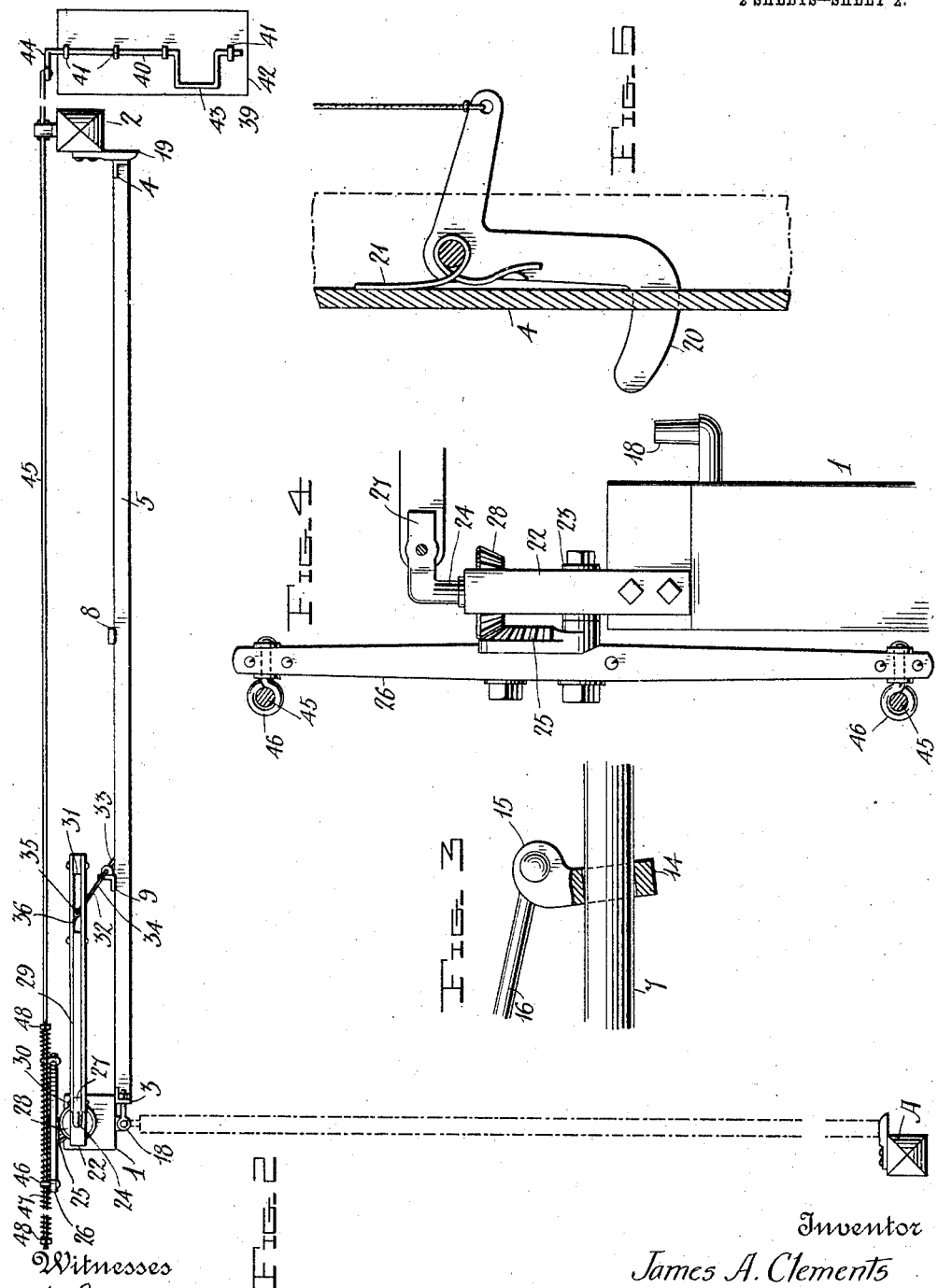
Witnesses
Inventor
James A. Clements
by Attorneys

UNITED STATES PATENT OFFICE.

JAMES A. CLEMENTS, OF ABINGDON, ILLINOIS, ASSIGNOR OF ONE-FOURTH TO JAMES W. HUNTER, ONE-FOURTH TO CHARLES W. ROBERTSON, AND ONE-FOURTH TO ALBERT R. CLEMENTS, ALL OF ABINGDON, ILLINOIS.

SWING-GATE.

No. 868,642.

Specification of Letters Patent.

Patented Oct. 22, 1907.

Application filed October 22, 1906. Serial No. 340,002.

*To all whom it may concern:*

Be it known that I, JAMES A. CLEMENTS, a citizen of the United States, residing at Abingdon, in the county of Knox and State of Illinois, have invented certain new and useful Improvements in Swing-Gates; and I do declare the following to be a full, clear, and exact description of the invention, such as will enable others skilled in the art to which it appertains to make and use the same.

My invention is an improved swing gate and means for operating the same, and it consists in the construction, combination, and arrangement of devices hereinafter described and claimed.

The objects of my invention are to provide a swing gate, which is simple in construction and effective in operation, to effect improvements in the construction of the gate whereby the same may be raised and lowered at will; and to provide improved means whereby the gate may be opened and closed, either manually or from a vehicle without rendering it necessary to alight from the same.

In the accompanying drawings,—Figure 1 is a side elevation of the gate embodying my improvements; Fig. 2 is a top plan view of the same; Fig. 3 is a detail elevation, partly in section, of a portion of the gate; Fig. 4 is a similar view of the gate-operating gear; and Fig. 5 is a detail view of the latch.

The post to which the gate is hung is indicated at 1, and that against which the gate opens is indicated at 2. The post against which the gate closes is indicated at A. The gate comprises the vertical inner and outer bars 3, 4, the top and bottom bars 5, 6, the intermediate longitudinal bar 7, and the central cross bar 8. Each of the bars 3, 4, 5, 6, is preferably made of angle steel. The ends of the bars 5, 6, are pivotally connected to the bars 3, 4, as at 9ª. The ends of the bar 7 are pivotally connected to the bars 3, 4, as at 10. The bar 8 is pivotally connected to the bars 5, 6 and 7, as at 11, and a support 9 is pivotally connected to the bars 5, 7, as at 12. The foregoing described bars constitute the frame of the gate, and the gate may be also provided with wires, as indicated at 13. By thus pivotally connecting the bars of the gate together, the outer ends of the gate may be raised and lowered, as may be required to swing freely over an uneven surface or other obstruction or to permit small animals to pass under the gate. The bar 7 is preferably, and is here shown as a tube. On the said bar, near the outer end thereof, is a collar 14, the inner diameter of which slightly exceeds the diameter of the bar 7. Said collar is slidable on said bar and is provided with an eye 15 on its upper side to which is hingedly connected a truss rod 16, the opposite end of the said truss rod being secured to the bar 3 of the gate, in any suitable manner, as at 17. The tension of the truss rod on the upper side of the collar 14 causes the latter to tilt somewhat, so that its upper and lower sides frictionally engage the bar 7 and the said collar thereby becomes adjustably locked to the bar 7 and coacts therewith and with the truss rod 16 to support the gate in any position, either horizontal or inclined. It is obvious that the gate may have its free or outer end either raised or lowered at will, and that it may be held in any position to which it may be adjusted, by causing the collar 14 to reëngage the bar 7. The hinges 18, by which the gate is hung to the post 1, may be of the form here shown, or of any other suitable construction. A suitable catch 19 is secured to one side of the post 2. The gate is provided with a pivoted latch 20 to engage the said catch, and a spring 21 is provided to hold the latch normally engaged with the catch.

On the upper end of the post 1 is secured a frame 22, which is provided with bearings for a horizontal shaft 23 and a vertical shaft 24. The shaft 23 carries a beveled segment gear 25 and an operating bar 26, which are rigidly secured thereto. The said bar 26 extends from the said shaft in opposite directions. The upper end of the shaft 24 has a horizontally-disposed arm 27. To the lower portion of said shaft is secured a beveled gear 28, which engages the segment 25. An operating arm 29, which is here shown disposed horizontally above the inner portion of the gate is hingedly secured to the arm 27 which enables said arm to move freely up or down with the gate, etc. Said arm is provided near its free or outer end with a slot 31. A rock-shaft 32 is disposed vertically and mounted in bearings on the front or outer side of the support 9. Said rock-shaft has an arm 33, which projects forwardly therefrom, and is provided at its upper end with a preferably rearwardly-projecting crank arm 34, which is in line with the arm 33, and has an upwardly-extending wrist 35, which operates in the slot 31. A chain wire, cord, or other suitable flexible connecting element 37, has one end attached to the arm 33 and the other end attached to the latch 30, whereby the latch is operated.

It will be understood that when the bar 26 is turned, the gears 25, 28, cause the operating arm 29 to be turned, and said arm causes the gate to be swung to an open or a closed position. At the initial movement of said arm 29, the same causes the rock-shaft 32 to turn slightly, so that the angular movement of the arm 33 thereof will cause said arm to draw upon the cord or other flexible connection 37 and cause the latter to trip the latch 20, and hence release the gate.

Within the scope of my invention, any suitable means may be employed to operate the bar 26, and I do not desire to limit myself in this particular. It is obvious that the gate may be opened or closed manually, since it is only necessary for the operator to trip the latch by hand in order to permit the gate to be swung to a closed or open position.

At suitable points on opposite sides of the gate vehicle-wheel-operating devices 39 are provided to enable the gate to be automatically opened and closed as a vehicle approaches or recedes from the same, and hence render it unnecessary to alight from the vehicle in order to operate the gate. Each of the said vehicle-wheel-operating devices is here shown as a rock-shaft 40, mounted in bearings 41 on a base plate 42, and provided with a crank 43 for operation by the wheel when the latter passes over it, and with a crank-arm 44. The crank arms are connected to opposite ends of the operating bar 26 by rods 45, which pass through pivoted eye-bolts or other devices 46 near the ends of the said bar 26, operate loosely therein, and are provided on opposite sides of said bar 26 with counteracting spring cushions 47, which are held in place on said rods, and the tension of which may be regulated by means of nuts 48. As a vehicle approaches the gate, it will be guided so as to cause one of its wheels to pass over one of the cranks 43 and thereby turn one of the rock-shafts 39 and cause the crank-arm 44 thereof to move the rod 45 attached thereto longitudinally, and cause said rod to turn the bar 26 and cause the gate to open. As the vehicle recedes from the gate after passing through the gateway, one of its wheels will be caused to strike the crank 43 of the other rock-shaft, and hence the gate will be operated in the reverse direction and closed. The counteracting springs 47 cushion the bar 26 and prevent undue stress from being exerted against said bar, the gate operating gears and the operating rod 45 by the sudden movement of the rock-shaft 40 by the vehicle wheels.

Having thus described my invention, what I claim as new, and desire to secure by Letters-Patent, is,—

1. A swinging gate having a latch, in combination with gate operating mechanism mounted on the gate support and having a pair of intermeshing gears, one provided with means whereby it may be turned, and the other having a vertical shaft provided with an operating arm projecting radially therefrom and substantially in line with the gate, and connections between said operating arm and the gate and the latch thereof to cause said arm to operate said latch and swing said gate, substantially as described.

2. In combination with a swinging gate and the supporting element therefor, a pair of intermeshing gears mounted on said supporting element, one having means whereby it may be turned, and the other having a vertical shaft and an operating arm projecting radially therefrom and extending over the inner portion of the gate and substantially in line therewith, a vertically-mounted shaft carried by the gate and having a crank-arm pivotally and slidably connected to the operating arm, a latch for the gate, and connections between said latch and said crank-shaft to operate said latch when the crank-shaft is turned by said operating arm, the latter and the crank-shaft also coacting to swing the gate in either direction, substantially as described.

3. In combination with a gate post and a swinging gate hung thereon, a frame on said post, a pair of beveled intermeshing gears mounted in said frame, one having means whereby it may be turned, and the other having a vertical shaft and a radially-disposed operating arm projecting from said shaft over the inner end of the gate, said arm having a longitudinal slot, a vertically-disposed rock-shaft mounted on and carried by the gate and having a crank provided with a wrist pivotally and slidably engaging the slot of the operating arm, a latch also carried by the gate, and an operating connection between said latch and said rock-shaft, for the purpose set forth.

4. In combination with a swinging gate and operating means therefor, including a pair of intermeshing gears, one having an operating bar, gate operating devices at points on opposite sides of the gate, rods operated by said gate operating devices and slidably connected to the operating bar at points near the ends thereof, and cushioning springs connecting said rods and said bar, for the purpose set forth.

5. In combination with a swinging gate and intermeshing operating gears therefor, one having an operating bar, rock-shafts mounted at points at opposite sides of the gate, and having cranks for operation by the wheels of a vehicle, rods operated by said rock-shafts and slidably connected to said operating bar, and cushioning springs between said rods and said operating bar, for the purpose set forth.

In testimony whereof I have hereunto set my hand in presence of two subscribing witnesses.

JAMES A. CLEMENTS.

Witnesses:
  W. F. EDMONSON,
  C. W. ROBERTSON.